United States Patent [19]
Gallacher et al.

[11] Patent Number: 5,901,204
[45] Date of Patent: May 4, 1999

[54] REMOTE SAMPLING OF VIDEO CLIPS

[75] Inventors: Kenneth D. Gallacher, Carnoustie; Mark M. Grossi, Muirhead; Grant C. Paton, Dundee; James Piggot, Downfield, all of United Kingdom; George E. Schneider, Springboro, Ohio

[73] Assignee: NCR Corporation, Dayton, Ohio

[21] Appl. No.: 08/522,656

[22] Filed: Sep. 1, 1995

[51] Int. Cl.[6] .................................................. H04M 11/00
[52] U.S. Cl. .................................... 379/90.01; 379/93.25; 379/93.17; 235/379; 348/14
[58] Field of Search ................................... 379/90, 91, 93, 379/96, 98, 90.01, 93.01, 93.12, 93.17, 93.21, 93.25, 93.22; 348/7, 13, 14, 15, 16, 18, 19; 395/242, 243, 326–328, 806; 235/379–381; 902/8, 9, 14; 705/42, 43

[56] References Cited

U.S. PATENT DOCUMENTS

| | | | |
|---|---|---|---|
| 3,876,864 | 4/1975 | Clark et al. | 235/379 |
| 4,438,326 | 3/1984 | Uchida | 235/379 |
| 4,884,199 | 11/1989 | Boothroyd et al. | 235/379 |
| 5,557,318 | 9/1996 | Gabriël | 348/7 |
| 5,568,181 | 10/1996 | Greenwood et al. | 348/7 |
| 5,604,341 | 2/1997 | Grossi et al. | 348/15 |
| 5,619,249 | 4/1997 | Billock et al. | 348/13 |

OTHER PUBLICATIONS

AT&T News Release, Rich Meyer, Mar. 19, 1991.
AT&T News Release, Blanchard Hiatt, Apr. 2, 1992.
AT&T News Release, Jim Mazzola, May 18, 1992.

*Primary Examiner*—Stella Woo
*Attorney, Agent, or Firm*—Gregory A. Welte

[57] ABSTRACT

The invention concerns remote sampling of video clips stored in a repository, such as a computer. The video clips, in principle, resemble video tapes, and contain both audio and video information. However, the video clips are stored in digital format.

In sampling, a single video frame and a segment of audio information is transmitted to a remote computer. The single frame is displayed while the audio is played. The invention allows a user to retrieve an entire video clip after the sampling.

21 Claims, 8 Drawing Sheets

REMOTE SAMPLING OF VIDEO CLIPS

The invention concerns sampling of video clips, which are stored in a repository, from a remote location. For each clip, the invention retrieves a single frame of video (or a sequence of frames), plus a segment of audio, such as a five-second segment, from the repository. The remote location can take the form of an Automated Teller Machine (ATM).

The invention also presents the sample in full-motion video format when broader-band services are used, such as ISDN or ATM.

BACKGROUND OF THE INVENTION

Historically, Automated Teller Machines (ATMs) have been used primarily for routine operations such as dispensing cash, making cash advances, providing account balance information, and the like. The capabilities of the machines have been limited to those of a bank teller, consistent with the designation "Automated Teller Machine."

The Inventors believe that the capabilities of the ATM can be extended beyond merely automating the function of the bank teller. The ATM can assume, or at least assist, functions performed by bank officers, such as granting of loans and extending lines of credit. In this capacity, it can be desirable to equip ATMs with video conferencing capability, in order to allow ATM customers to hold video conferences with the bank officers.

If an ATM is equipped with video conferencing capability, it may be desirable to use the video conferencing equipment for purposes in addition to communicating with bank officers. Customers of the ATM may wish to hold video conferences with other parties, or use the equipment for other purposes.

OBJECTS OF THE INVENTION

An object of the invention is to provide an improved ATM.

A further object of the invention is to provide an ATM which is equipped with video conferencing capability, and which can sample video messages, or video clips, stored at a remote location.

A still further object of the invention is to provide an ATM which can sample video messages held in a video answering machine.

SUMMARY OF THE INVENTION

In one form of the invention, video clips are stored in a repository, such as a computer. A user, located remote from the repository, (i) connects with the repository, (ii) obtains a sample of each clip, such as a single frame of video and five seconds of audio, and (iii) plays the samples. Then, if desired, the user can retrieve an entire clip.

DETAILED DESCRIPTION OF THE INVENTION

Video Conferencing

Figure 1:
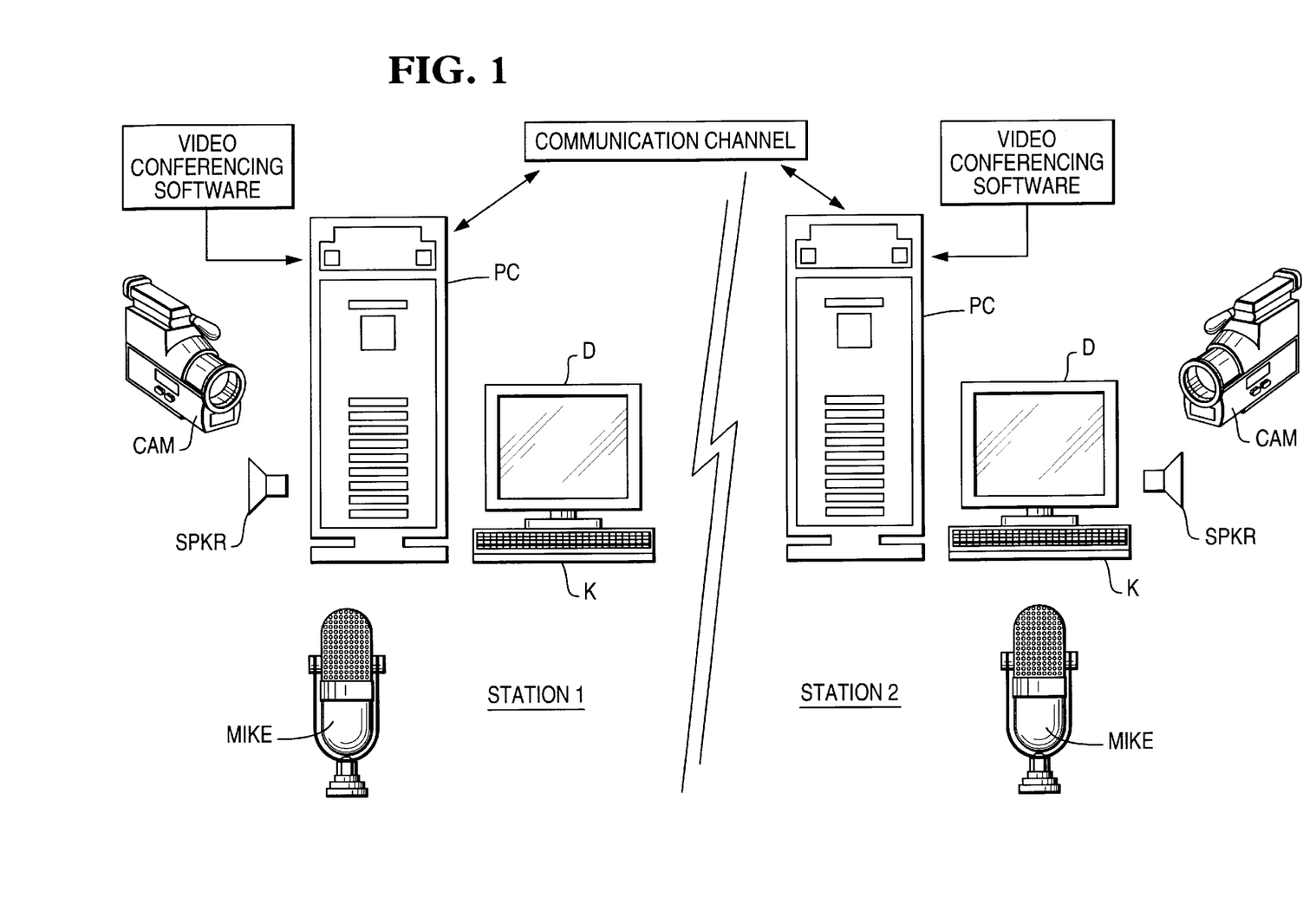
FIG. 1 illustrates two computers equipped with video conferencing capability.

FIG. 1 illustrates two video conferencing stations. Each includes a computer labeled PC, such as the well-known Personal Computer having an architecture designed around the 8xx86 series of microprocessors available from INTEL Corporation, Santa Clara, Calif. Each station also includes a display D, a keyboard K, a video camera CAM, a microphone MIKE, and a speaker SPKR. The displays are linked by a COMMUNICATION CHANNEL, which can take the form of a standard, common-carrier telephone channel, or a high capacity telephone channel, such as commercially available ISDN facility.

Each station also includes appropriate software for maintaining a video conference, such as the VISTIUM system, available from AT&T Global Information Solutions Company, located in Dayton, Ohio.

As will be discussed later, one of the stations can be located at an ATM.

Storage of Video Clips

Figure 2:
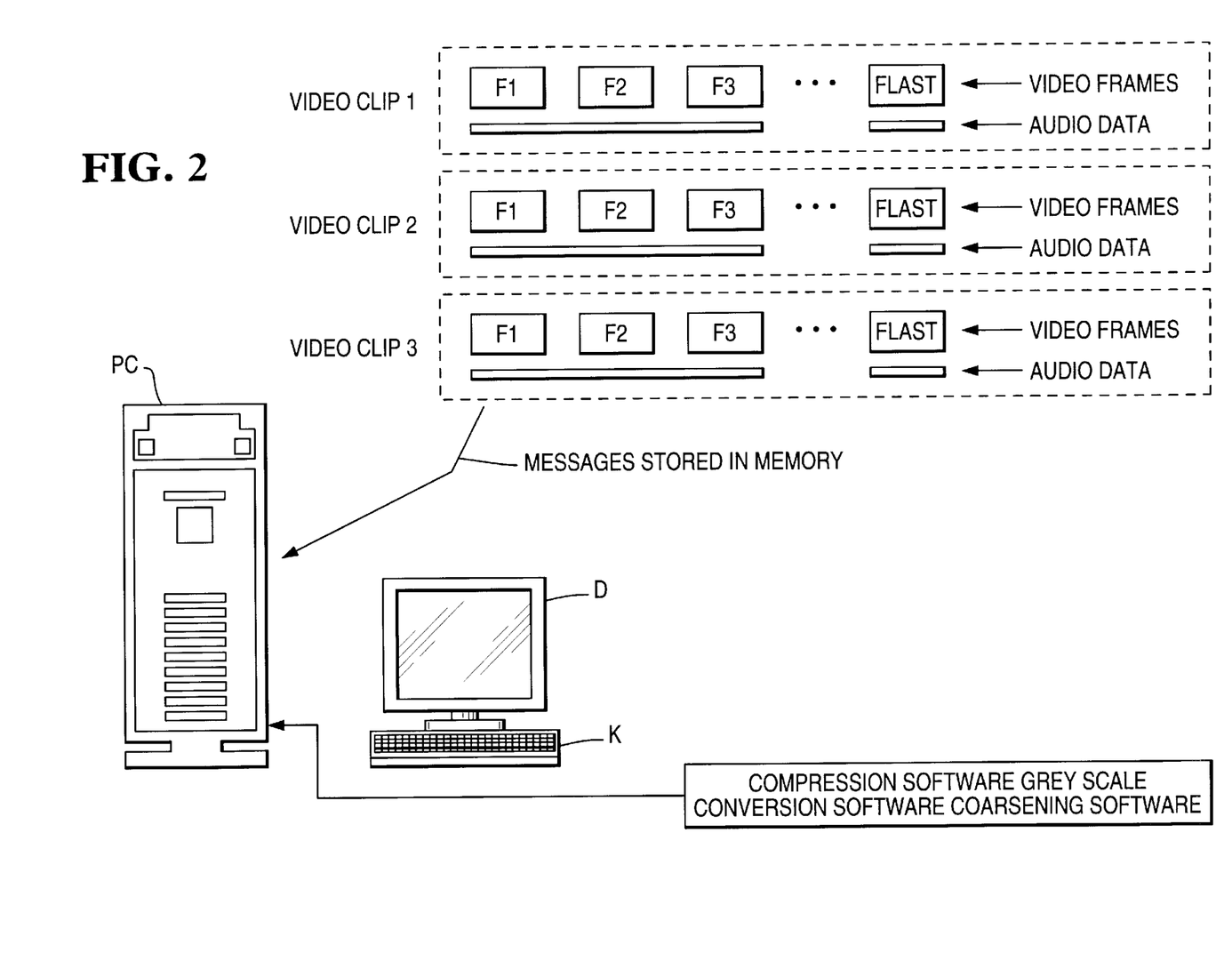
FIG. 2 illustrates storage of video clips within one of the computers of FIG. 1.

One of the stations acts as a repository for stored video data. The video data is similar to movie film, in the sense that the video data is stored in the form of individual frames, together with a "sound track." However, unlike movie film, the video data is stored in digital format. FIG. 2 is a representation of the storage of three segments of video data. The video data will be termed "video clips."

The video clips can be generated using the equipment shown in FIG. 1, together with commercially available video software. Five examples of such software are the following:

VideoDirector, manufactured by Gold Disk Corporation, 1995 telephone numbers (800) 465-3375 or (408) 982-0200;

Smart Video Recorder PRO, manufactured by INTEL Corporation, Santa Clara, Calif.;

Matrox Studio, manufactured by Matrox, 1995 telephone numbers (800) 361-4903 or (514) 685-2630;

Video Navigator, manufactured by MediaWare, 1995 telephone number (602) 298-5355; and Destiny, manufactured by Sony Corporation, 1995 telephone number (800) 523-7669.

Sampling of Video Clips

Figure 3:
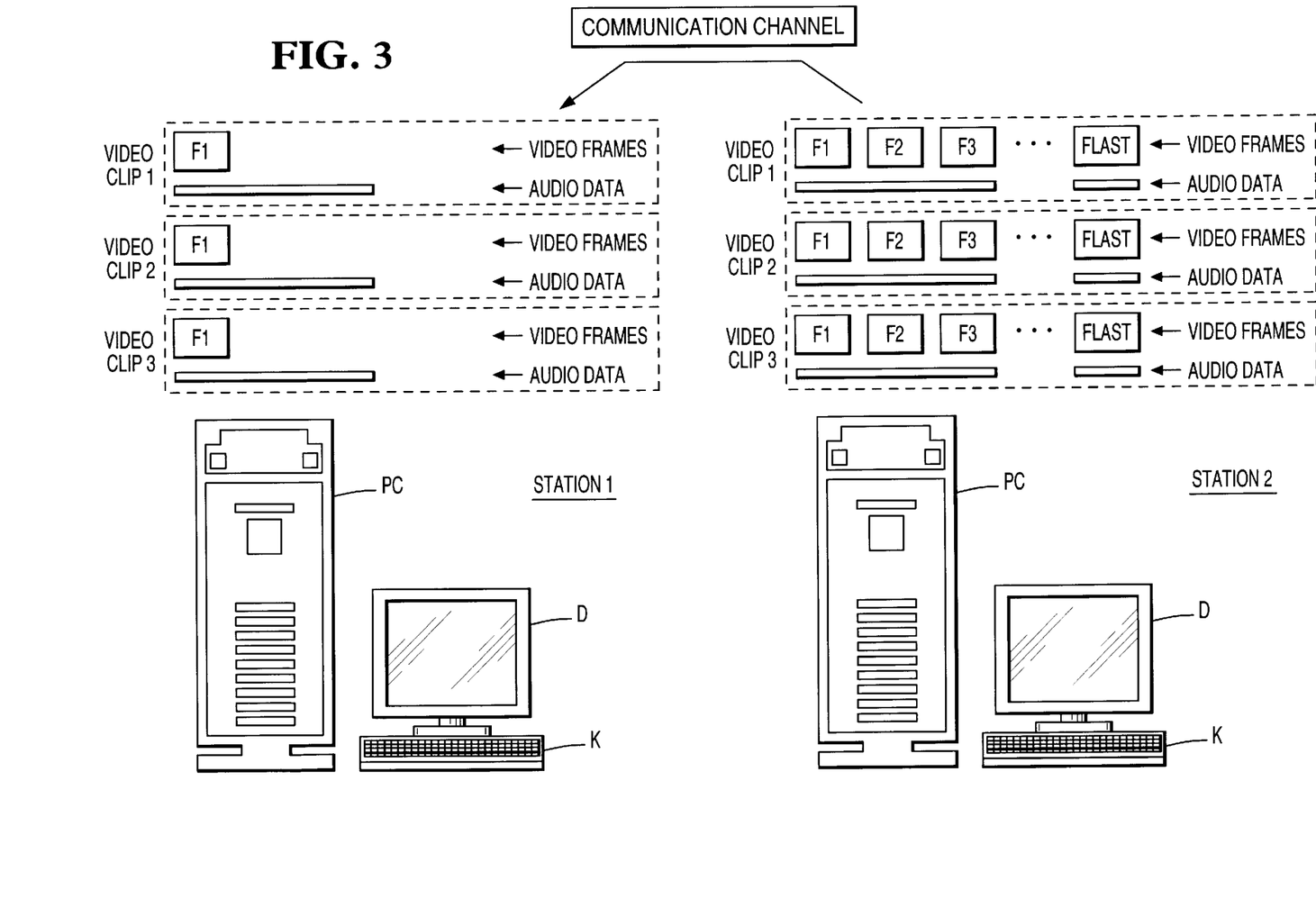
FIG. 3 illustrates transfer of samples of video clips from one computer to another.

The invention allows a user of one video conferencing station, such as station 1 in FIG. 1, to sample the video clips which are located at the other station. A basic conception of sampling is illustrated in FIG. 3.

In sampling, one frame from each clip, such as frame F1, is copied to the other station. In addition, a sample of the audio, such as a five-second sample, is also copied.

Upon receipt at station 1, the single frame is displayed, and resembles a still picture. The five-second audio sample is played through a speaker located at station 1. The video software identified above handles the playing of the video and audio. It is known within the art how to display a single video frame, while playing a recorded audio segment.

In addition, for each video clip, both the single frame and five-second audio sample can be stored in memory at the receiving station, station 1. This storage allows the user to re-play the samples if desired.

After viewing the samples, the user can decide whether to order that a full video clip be retrieved from the remote repository. If so, the entire clip is retrieved, and the user can view the full clip.

Logic Operating at STATIONs 1 and 2

Figure 4:
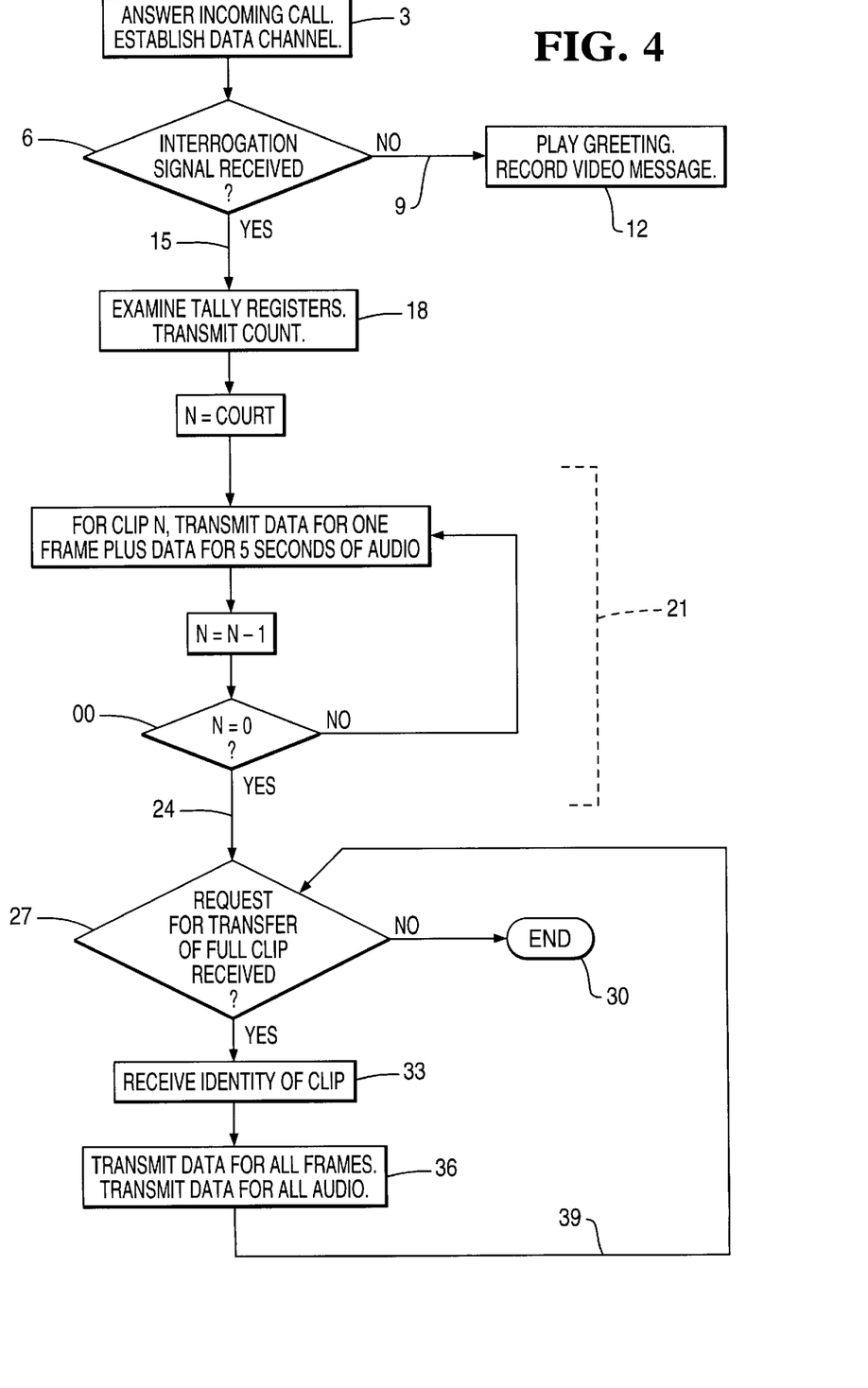
FIGS. 4 and 5 illustrate logic which operates within the computer storing video clips.
Figure 5:
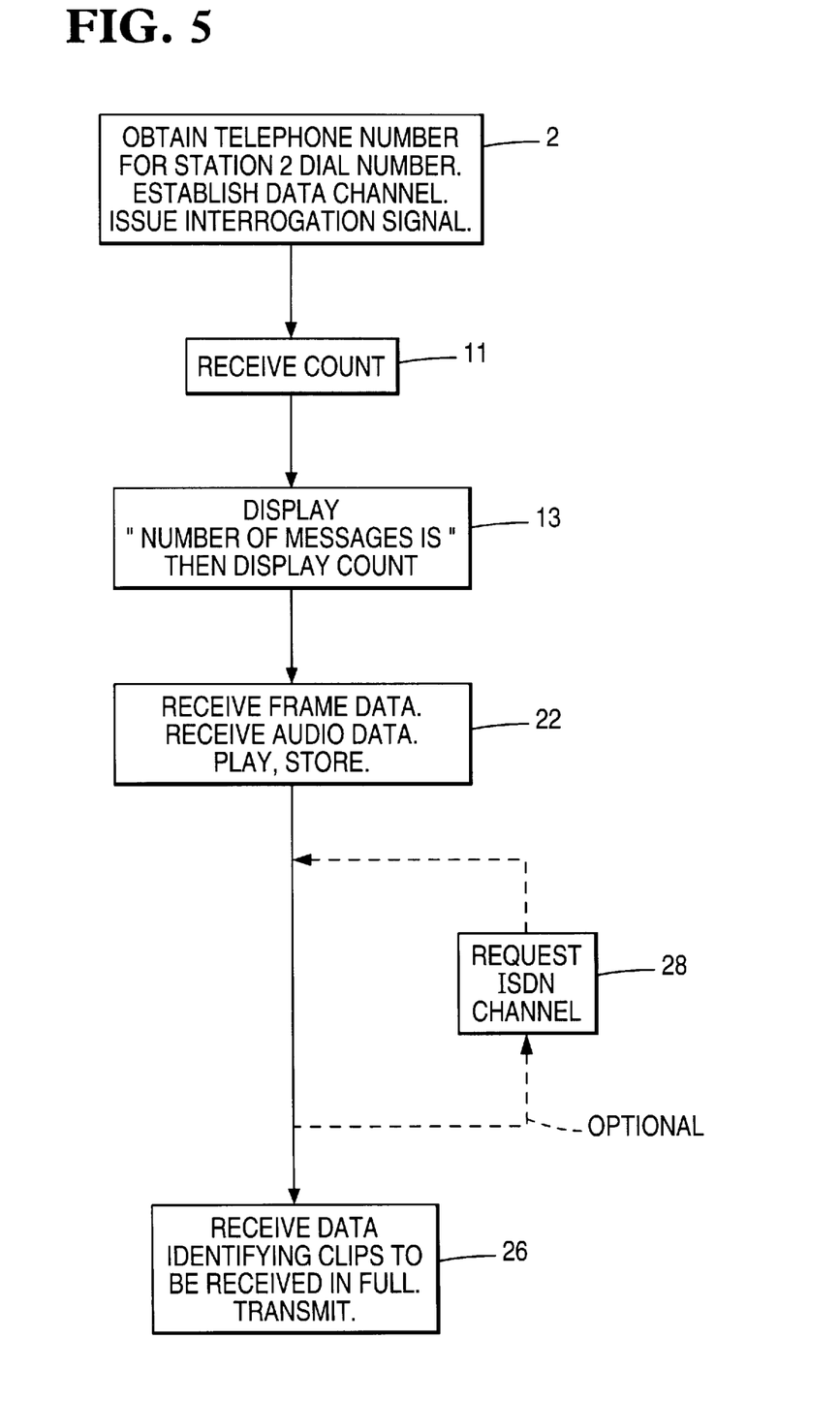

FIG. 4 illustrates logic which operates at the repository, (STATION 2 in FIG. 3), and FIG. 5 illustrates logic operating at STATION 1. In FIG. 5, block 2, the user provides the telephone number of STATION 2. STATION 1 connects with STATION 2, as indicated by block 2 and also by block 3 in FIG. 4. In block 2 in FIG. 5, STATION 1 issues an INTERROGATION SIGNAL, requesting samples of video clips.

In FIG. 4, decision block 6 looks for the interrogation signal. If no interrogation signal is received, then branch 9 is taken, and STATION 2 handles the incoming call in its usual way. For example, STATION 2 may be a computer equipped to operate as a telephone answering machine. If so, STATION 2 plays a normal greeting and records the caller's message, as indicated by block 12.

If an interrogation signal is received, branch 15 is taken, leading to block 18. STATION 2 contains a tally register which contains a count of the number of video clips stored. Block 18 examines the tally register, and transmits to STATION 1 the number of stored clips. STATION 1 receives and displays this number to the user, as indicated by blocks 11 and 13 in FIG. 5.

Then loop 21 in FIG. 4 transmits a frame from each clip, plus a five-second sample of audio information. Upon transfer of all samples, branch 24 is taken, and block 27 is reached. STATION 1 receives this data, and plays the samples, as indicated by block 22 in FIG. 5. STATION 1 stores the data, as also indicated. (Storage is not strictly required, as discussed above.)

In block 26 in FIG. 5, the user identifies, if desired, those clips which are to be transmitted in full to STATION 1. Block 27 in FIG. 4 responds to this identification. If no full clips are to be transmitted, block 30 is reached. Otherwise, block 33 is reached, wherein STATION 2 receives the identities of the clips.

STATION 2 then transmits the identified clip in its entirety to STATION 1. Branch 39 allows STATION 1 to request more than one clip.

As optional block 28 in FIG. 5 indicates, the user may wish that the full clips be transmitted by a high-capacity data channel, such as ISDN. If so, a high capacity link is established. The STATION which establishes this link is not considered significant, and so the establishment step is not indicated in the Figures.

Additional Considerations

Figure 6:
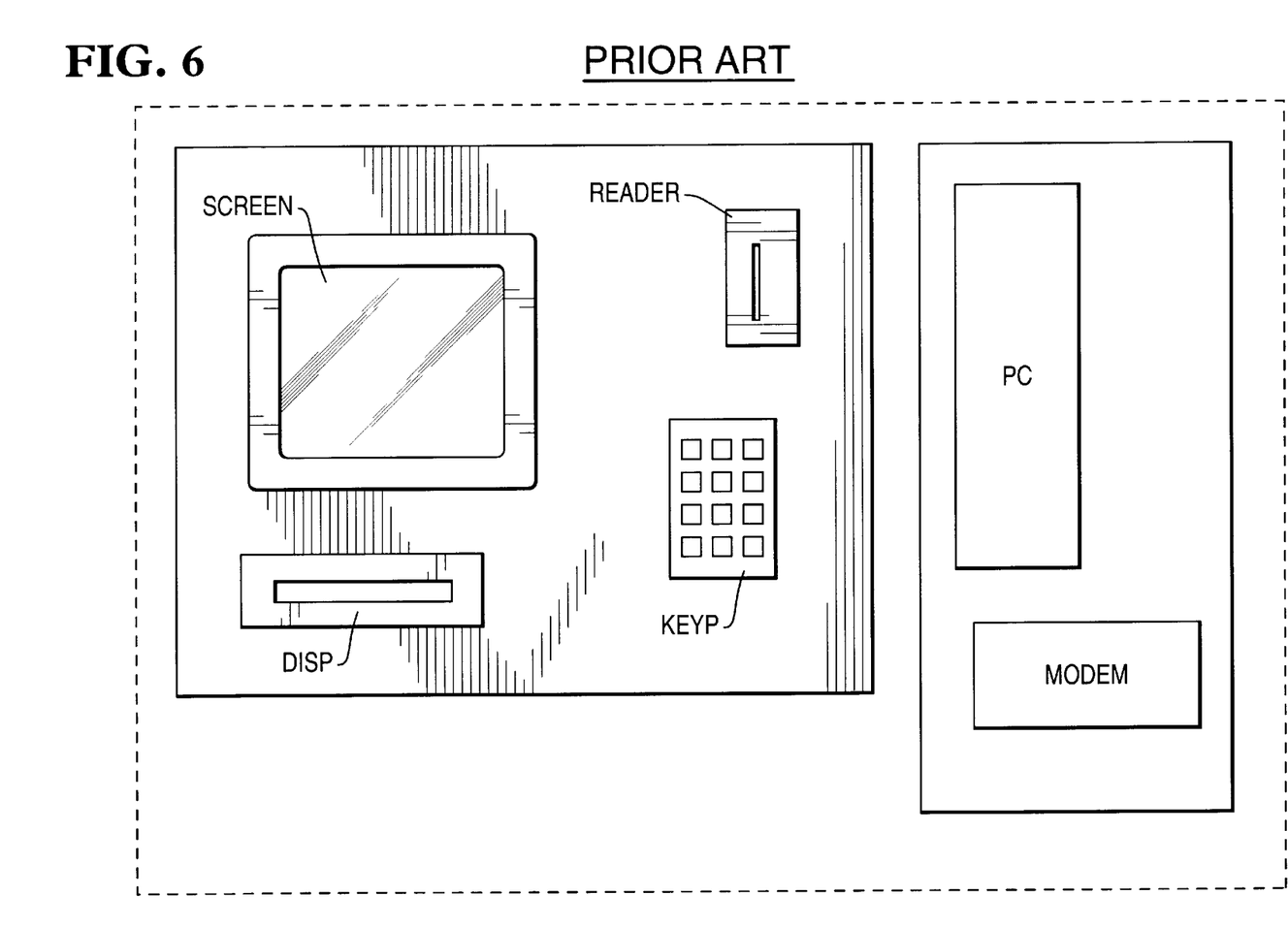
FIGS. 6 and 6A illustrates an ATM with which the invention can be associated.

1. As stated above, one of the STATIONs can be located at an Automated Teller Machine, ATM. FIGS. 6 illustrates, in schematic form, some of the equipment contained in a prior-art (ATM). The equipment includes a Personal Computer (PC) and a MODEM. The latter allows the PC to communicate with the financial institution which owns the ATM.

The equipment also includes the following:

A magnetic card READER, which reads an identification card presented by a user of the ATM.

A keypad, labeled KEYP, which allows a user to enter data.

A dispenser, labeled DISP, which dispenses currency to the customer.

A video display, labeled SCREEN, which allows the PC to display information to the customer.

Figure 6A:
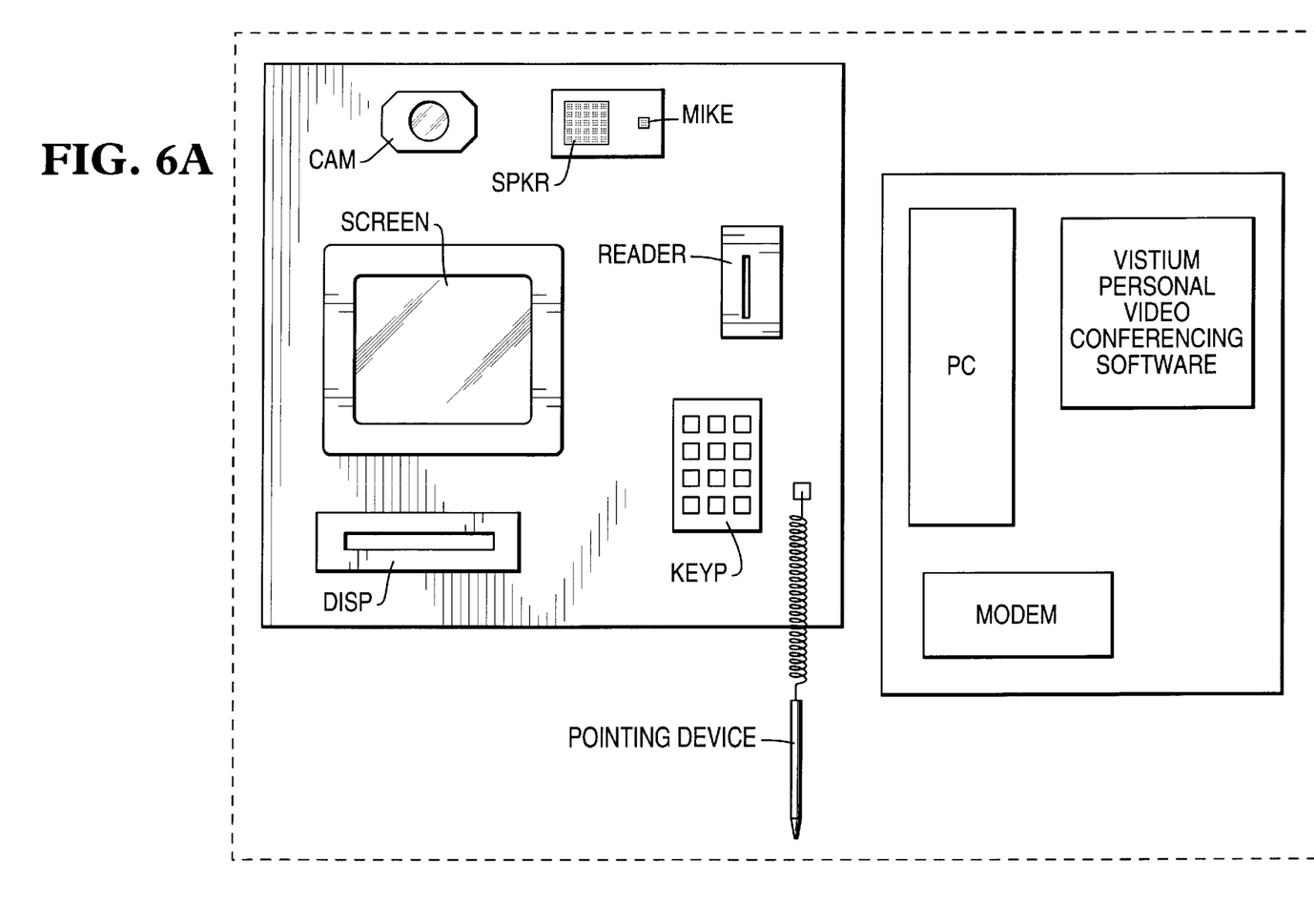

One form of the invention adds the equipment shown in FIG. 6A. This added equipment includes the following:

A video camera, labeled CAM.

An audio speaker, labeled SPKR.

An audio microphone, labeled MIKE. The speaker and microphone can be consolidated into a telephone handset.

A POINTING DEVICE, such as a light pen, pen-type trackball, or mouse.

VISTIUM PERSONAL VIDEO CONFERENCING SOFTWARE, which is a commercially available product, which can be purchased from AT&T Global Information Solutions Company, Naperville, Ill. An early version of this product was designated "Telemedia Connection."

A standard QWERTY KEYBOARD, as shown in FIG. 3, can be added, perhaps in replacement of the keypad KEYP.

The keypad KEYP need not be discrete component, but can be integrated into the display DISP, by using a touch-sensitive screen within the display.

This equipment allows a user of the ATM to establish a video conference with another video conferencing station. In a video conference, each party can speak to, and hear, the other, by means of the speaker SPKR and microphone MIKE in FIG. 6A. Also, each party can see, on the SCREEN, the image which is captured by the camera CAM of the other party. This image can include the face of the other party, or an object, such as a document, which the other party presents to the camera CAM.

Some important features of this ATM-embodiment are the following:

a) ATM EXECUTES FINANCIAL TRANSACTIONS via DEDICATED LINE

When a user wishes to execute a financial transaction at the ATM, the ATM communicates with the financial institution owning the ATM via a dedicated telephone line. This dedicated line allows the ATM to call only selected numbers, and allows only selected numbers to reach the ATM, for security purposes. This dedicated line, and communication on it, is not involved in the present invention, and is not disturbed.

b) PC RUNS VIDEO SOFTWARE IN ADDITION TO NORMAL ATM SOFTWARE

The PC shown in FIG. 6A runs the video software discussed above, in addition to the software normally used by the ATM. Running of more than one set of software is allowed by the PC's operating system, which is preferably that designated OS/2, available from IBM corporation. The pre-emptive multi-tasking feature of OS/2 allows these multiple sets of software to run.

2. The Inventors envision use of a two-level communication protocol during the sampling and retrieval process. The Inventors envision that the remote sampling of video clips will be undertaken using one protocol, namely, an ordinary telephone connection, commonly termed a POTS line (Plain Old Telephone Service). One advantage of using a POTS line is low expense: the sampling involves a simple telephone call over a standard telephone line.

Then, if the user decides to retrieve an entire video clip, the user can either use a POTS line, or switch to a higher-capacity data channel, such as an ISDN channel. The ISDN channel represents the second protocol.

The higher capacity channel accommodates rapid transfer of the large amounts of data stored in a video clip. A hypothetical, but realistic, example will illustrate the amounts of data involved.

EXAMPLE

Amount of Data in Question

One set of video specifications is found in IEEE (Institute of Electrical and Electronics Engineers) standards H.221., T.120, and H.320.

The VISTIUM software, identified above, generates a window on a computer display which conforms to commercially known CIF and QCIF standards.

Under the CIF standard, the video image which is transmitted occupies a window on the display of about 352 pixels horizontally, and 288 pixels vertically, giving a total of 101,376 pixels per window. This number will be rounded to 100,000. The QCIF standard uses a window in which each dimension is one-half that in CIF, providing one-fourth the area of CIF, or 25,000 pixels.

For a color image, it will be assumed that each pixel requires eight bits, or one byte, of color information. Thus, for sampling a clip under the QCIF standard, 8×25,000, or 200,000 bits, are required for a single frame of video.

Time Needed to Transmit One Sample

A POTS line, available in 1995, provides a maximum data rate of about 30,000 bits per second. Thus, to transfer a full QCIF frame of 200,000 bits, about 7 seconds are required (200 divided by 30 equals about 7).

The time required to transfer the associated audio depends on the amount of audio data stored, which, in turn, depends on the sampling rate used to digitize the audio signal. A common rule-of-thumb states that 4,000 bits per second is sufficient to digitize telephonic audio signals. Thus, a five-second sample of digitized audio taken from the video clip will require about one-half second for transmission. (5×4, 000/30,000 equals about one-half.)

Therefore, using a POTS line for transmission of each sample conforming to the QCIF standard will require about 7.5 seconds. That is, the sample for each clip requires about 7.5 seconds of transmission time: if a user wishes to sample eight clips, the transmission time will take about one minute.

Time Needed to Transmit Entire Clip

If the user wishes to retrieve an entire clip after sampling, however, the transmission time will jump drastically. True, or nearly true, full-motion video requires about 15 frames per second. As computed above, a single frame requires about 7.5 seconds transmission time. Fifteen frames (required for one second of video) will thus require about 112 seconds of transmission time.

Thus, to transfer five seconds of video requires about 112×5, or 560 seconds. As computed above, the time for transfer of the accompanying audio will be about one-half second, which is negligible, compared with 560 seconds.

Alternate Channels are Faster

Because of this large transmission time (560 seconds, or about nine minutes) for a five-second video clip, POTs lines probably will not be favored. Instead, a higher capacity channel will perhaps be used, such as the ISDN.

One Measure of Fast Channel

From a simple perspective, the VISTIUM system, discussed above, uses the ISDN protocol to transmit video conferences, in real time (but compression and other techniques are used). If the ISDN can carry a video conference in real time, then the ISDN can carry a recording of a video conference (ie, a video clip) in real time also. Thus, an ISDN channel can transmit a five-second video clip in the same amount of time: about five seconds.

Another Measure of Fast Channel

From a more mathematical perspective, and ignoring compression and the like, an ISDN channel transmits about 128,000 bits per second. As a very approximate measure, the ISDN rate of 128,000 can be rounded to 120,000, which is four times the POTS rate of 30,000. Under this approximation, without compression, the ISDN protocol can transmit a video clip in about one-fourth the time required by the POTS protocol.

Recapitulation

Therefore, in one form of the invention, sampling of video clips is done using a POTS line, and then retrieval, if desired, of one or more clips is done using a higher capacity line, such as ISDN.

3. Several techniques can reduce the amount of data required to be transmitted. Compression is one technique. A reasonable estimate is that the QCIF image of 200,000 bits, discussed above, can, by compression, be reduced to a range of about 200 to 2,000 bits. Compressing by a factor of 1,000 is within the state of the art, although, as compression rates increase, error rates tend to increase also.

Another technique is to eliminate, or reduce, color information, either for the sample, or the video clip, or both. For example, if a 25,000 pixel QCIF image is changed from color to grey-scale, and if the grey scale contains 4 levels, then each pixel can be represented by two bits (2 squared=4 levels), providing a total of 50,000 bits per frame. This number is one-fourth the numbers discussed above, reducing transmission time to one-fourth of the times given above.

If eight levels of grey are used, then three bits per pixel are sufficient, giving a total of 75,000 bits per frame.

Figure 7:
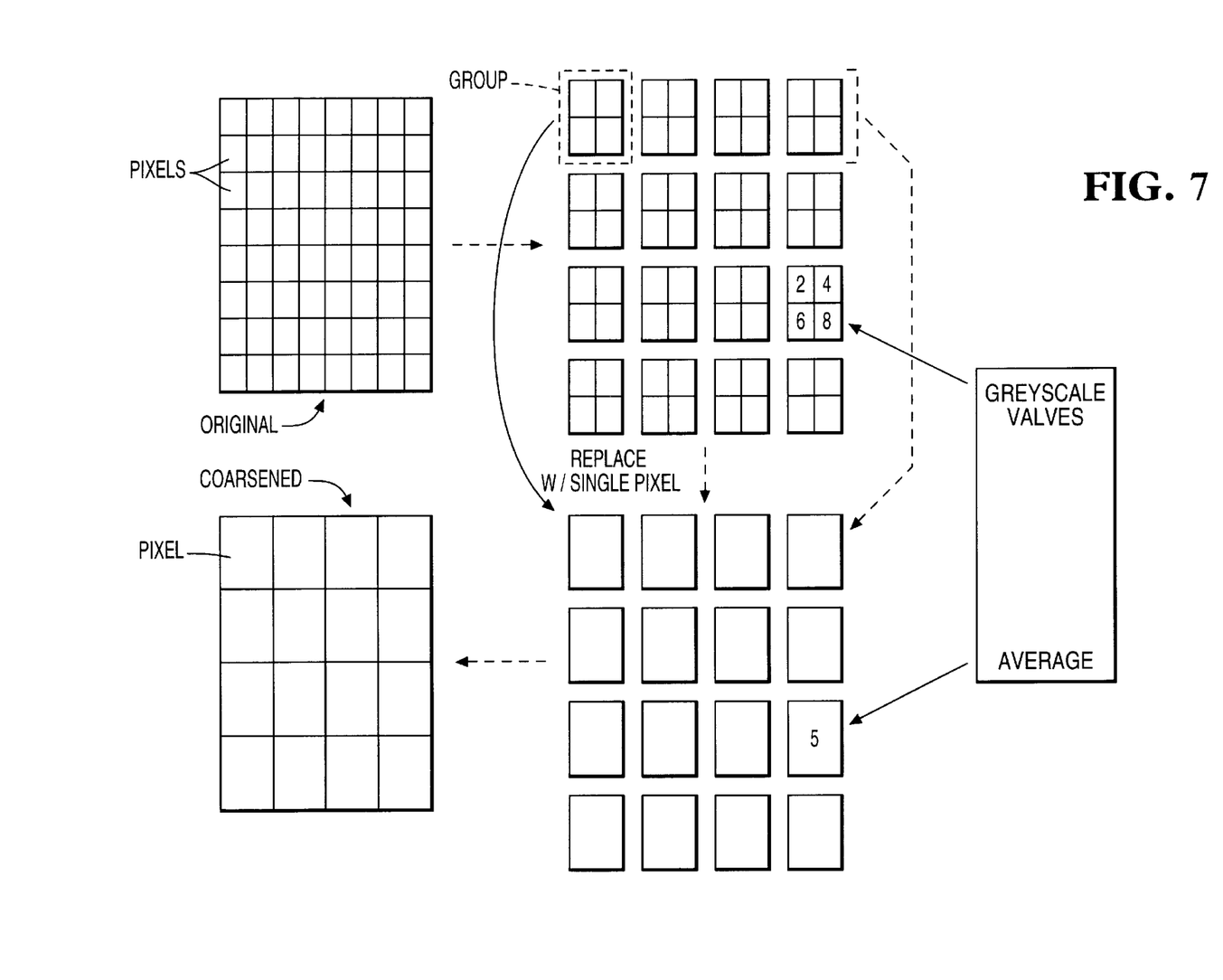
FIG. 7 illustrates the concept of coarsening the resolution of an image.

A third technique is to reduce resolution, or coarsen, the image. For example, pixels can be grouped into clusters, and a single pixel can be derived from each cluster. As a specific illustration, as shown in FIG. 7, a frame can be conceived as an 8×8 matrix of pixels (64 pixels total). The pixels can be grouped into clusters of 2×2, as in FIG. 7A. Each cluster can be represented by a single pixel, as shown in FIG. 7B. If the original 64-pixel frame was coded in grey-scale values, then each resultant pixel can take a numerical average (or other average) of the four pixels in its cluster. The Figure provides an illustration of this concept.

If the original frame was coded in color values, other, known, approaches can ascribe a color to the resultant pixel.

4. Recapitulating, the invention presumes the following types of operation, to reduce the bandwidth required for transmission of the samples and the clips themselves (it is assumed that the original video clips are recorded as color images):

a) For sampling, either (i) convert the single frame which is the subject of the sample to grey scale, or (ii) use the original color data.

b) For retrieval of an entire clip, either (i) convert the clip to grey scale, or (ii) transmit color data. In all cases, compression, coarsening, or both, can be used.

Software for conversion to grey scale, compression software, and coarsening software are indicated in FIG. 2.

5. The remote repository (eg, STATION 2) can take the form of a device which receives audio-video telephone calls, and stores a recording of the incoming calls, somewhat analogous to an audio telephone answering machine.

Definitional Matters

1. One definition of "video clip" is a sequence of video frames, together with audio. The video and audio data is stored in digital format. The term "clip" has historical origins: a short piece of movie film, cut (or "clipped") from a longer segment, is called a "film clip."

Under the invention, the sample of the clip can be a single frame, or multiple frames. The multiple frames can be a sequence of frames, or can be periodically selected from the clip, such as every second.

2. One definition of "audio/video" clip is a clip which contains both audio and video information.

3. One definition of "sample" is: part of a clip. "Sample" does not refer to a clip in its entirety (except in the case where the clip itself is so small that a "sample" would equal the size of the clip). A sample comprising a single frame and five seconds of audio information was discussed above. Other numbers of frames, and other durations, can be used.

4. "PC" is an acronym for "Personal Computer." PC refers to programmable digital computers of sufficiently small size to fit upon, or beneath, an ordinary desk.

5. POTS lines were discussed above. POTS lines are also called PSTN lines, or Public Service Telephone Network.

Numerous substitutions and modifications can be undertaken without departing from the true spirit and scope of the invention. What is desired to be secured by Letters Patent is the invention as defined in the following claims.

We claim:

1. In an ATM, the improvement comprising:
   a) means for ordering a remote repository, which stores audio/video clips, to transmit samples of the clips to the ATM;
   b) means for displaying the samples to the user.

2. Apparatus according to claim 1, in which the transmission is done using a public-service telephone network.

3. Apparatus according to claim 1, and further comprising:
   c) means for allowing the user to
      i) select a clip, and
      ii) cause the repository to transmit the entire clip.

4. Apparatus according to claim 1 wherein the samples each contain no more than a single frame of video information.

5. Apparatus according to claim 1 wherein the samples each contain about one single frame of video information.

6. Apparatus according to claim 1, wherein
   i) the samples are received over an ordinary telephone line, having a maximum data rate of about 30,000 bits/second, and
   ii) the entire video clips are received over a telephone channel having a data capacity in excess of 100,000 bits per second.

7. Apparatus according to claim 1, wherein the repository contains video messages intended for delivery to the user.

8. Apparatus according to claim 1, wherein the repository comprises a video answering machine.

9. Improvement according to claim 1, wherein the means of paragraph (a)
   1) comprises a means for receiving a selection of a sample from a user, and
   2) orders the remote repository to take the selected sample from a clip and transmit the selected sample.

10. Improvement according to claim 1, wherein the sample does not include some portions its corresponding clip.

11. Apparatus according to claim 1, wherein the repository comprises a video answering machine which receives video calls over a telephone channel, and stores video messages delivered through said calls.

12. A method of operating an ATM, comprising the following steps:
   a) connecting to a repository of audio/video clips;
   b) receiving samples of said clips, which samples contain audio and video information; and
   c) displaying to the user audio and video information derived from the samples.

13. The method according to claim 12, in which the samples are received after transmission along a standard telephone channel having a bandwidth of less than about 30,000 bits/sec.

14. The method according to claim 12, and further comprising the step of receiving an entire video clip, after the displaying step of paragraph (c).

15. The method of claim 14, in which said entire video clip is received by transmission along a telephone channel having a data capacity in excess of 100,000 bits per second.

16. Method according to claim 12 wherein the samples each contain no more than a single frame of video information.

17. Method according to claim 12 wherein the samples each contain about one single frame of video information.

18. Method according to claim 12, wherein
   i) the samples are received over an ordinary telephone line, having a maximum data rate of about 30,000 bits/second, and
   ii) the entire video clips are received over a telephone channel having a data capacity in excess of 100,000 bits per second.

19. Method according to claim 12, wherein the repository contains video messages intended for delivery to the user.

20. Method according to claim 12, wherein the repository comprises a video answering machine.

21. Apparatus according to claim 12, wherein the repository comprises a video answering machine which receives video calls over a telephone channel, and stores video messages delivered through said calls.

* * * * *